(12) United States Patent
Dao

(10) Patent No.: US 10,235,230 B2
(45) Date of Patent: Mar. 19, 2019

(54) METHOD FOR SENDING A PLURALITY OF DATA FROM A SERVER TO A PLURALITY OF DEVICES

(71) Applicant: GEMALTO SA, Meudon (FR)

(72) Inventor: Frédéric Dao, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 16/070,302

(22) PCT Filed: Mar. 21, 2017

(86) PCT No.: PCT/EP2017/056621
§ 371 (c)(1),
(2) Date: Jul. 16, 2018

(87) PCT Pub. No.: WO2017/186411
PCT Pub. Date: Nov. 2, 2017

(65) Prior Publication Data
US 2019/0012224 A1 Jan. 10, 2019

(30) Foreign Application Priority Data
Apr. 25, 2016 (EP) ..................................... 16305479

(51) Int. Cl.
*G06F 12/00* (2006.01)
*G06F 11/07* (2006.01)
(Continued)

(52) U.S. Cl.
CPC .......... *G06F 11/0742* (2013.01); *G06F 3/065* (2013.01); *G06F 3/0683* (2013.01);
(Continued)

(58) Field of Classification Search
CPC ............. G06F 11/0742; G06F 11/0709; G06F 11/1443; G06F 11/1448; G06F 11/1451;
(Continued)

(56) References Cited

U.S. PATENT DOCUMENTS

2004/0250031 A1 12/2004 Ji et al.
2016/0110440 A1 4/2016 May et al.
(Continued)

FOREIGN PATENT DOCUMENTS

EP 2 602 725 A1 6/2013
EP 2 849 464 A1 3/2015
(Continued)

OTHER PUBLICATIONS

International Search Report (PCT/ISA/210) dated May 15, 2017, by the European Patent Office as the International Searching Authority for International Application No. PCT/EP2017/056621.
(Continued)

*Primary Examiner* — Shawn X Gu
(74) *Attorney, Agent, or Firm* — Buchanan Ingersoll & Rooney PC

(57) ABSTRACT

The invention is a method sending a plurality of data from a server to a fleet of devices. The method comprises the following steps: splitting said plurality of data in a set of disjoint batches, uniquely allocating to each of said disjoint batches a time slot, identifying a selected data belonging to the disjoint batch which is allocated to the current time slot and sending the selected data from the server to one device of said fleet, and if an incident occurs at the server, discarding from the server the disjoint batch allocated to the time slot during which the incident occurred.

10 Claims, 3 Drawing Sheets

(51) Int. Cl.
  *G06F 11/14* (2006.01)
  *G06F 11/20* (2006.01)
  *G06F 3/06* (2006.01)

(52) U.S. Cl.
  CPC ........ *G06F 3/0689* (2013.01); *G06F 11/0709* (2013.01); *G06F 11/1443* (2013.01); *G06F 11/1451* (2013.01); *G06F 11/1469* (2013.01); *G06F 11/2082* (2013.01)

(58) Field of Classification Search
  CPC ............. G06F 11/1458; G06F 11/1469; G06F 11/2082; G06F 3/065; G06F 3/0683; G06F 3/0689
  See application file for complete search history.

(56) References Cited

U.S. PATENT DOCUMENTS

| | | |
|---|---|---|
| 2016/0196188 A1 | 7/2016 | Castellanos et al. |
| 2016/0234013 A1 | 8/2016 | El-Marouani et al. |

FOREIGN PATENT DOCUMENTS

| | | | |
|---|---|---|---|
| WO | WO 2015/038137 | 3/2015 | |
| WO | WO-2015038137 A1 * | 3/2015 | .......... G06F 11/1438 |

OTHER PUBLICATIONS

Written Opinion (PCT/ISA/237) dated May 15, 2017, by the European Patent Office as the International Searching Authority for International Application No. PCT/EP2017/056621.

* cited by examiner

| Batch number | Subscription ICCID | Timestamp for starting cycle | Slot size | Available for download at T time |
|---|---|---|---|---|
| 1 | XXXXXXXX1 | T0 | W | T0 <= T < T0 + W |
| 1 | XXXXXXXX2 | T0 | W | T0 <= T < T0 + W |
| 1 | XXXXXXXX3 | T0 | W | T0 <= T < T0 + W |
| 2 | XXXXXXXX4 | T1= T0 + W | W | T1 <= T < T1 + W |
| 2 | XXXXXXXX5 | T1= T0 + W | W | T1 <= T < T1 + W |
| 3 | XXXXXXXX6 | T2= T0 + 2W | W | T2 <= T < T2 + W |
| 3 | XXXXXXXX7 | T2= T0 + 2W | W | T2 <= T < T2 + W |
| 3 | XXXXXXXX8 | T2= T0 + 2W | W | T2 <= T < T2 + W |
| 3 | XXXXXXXX9 | T2= T0 + 2W | W | T2 <= T < T2 + W |

METHOD FOR SENDING A PLURALITY OF DATA FROM A SERVER TO A PLURALITY OF DEVICES

FIELD OF THE INVENTION

The present invention relates to methods of sending a plurality of data from a server to a plurality of devices. It relates particularly to methods of managing a deployment campaign from a server to a fleet of devices.

BACKGROUND OF THE INVENTION

It is known to use a server for downloading data to a plurality of devices. For example, a server may be in charge of downloading data related to Telecom subscriptions in a fleet of Universal Integrated Circuit cards (UICCs). Generally, such a server comprises a main data storage machine which is associated with a backup machine. The backup machine allows to restart the service under acceptable conditions when a serious incident occur at the active server. Preferably, the main data storage machine and the backup machine are arranged so as to provide geographic redundancy.

Since the backup machine is intended to contain at least one copy of all data considered worth saving, the data storage requirements can be significant. Organizing this storage space and managing the backup process can be a complicated undertaking. Since real time synchronization is very costly, many servers are designed with a synchronization latency which can last up to several minutes. Such servers can face synchronization errors when the main data storage machine goes down since actions performed on the main data storage machine side are not yet reflected on the backup machine side.

There is a need for enhancing servers designed with a synchronization latency between the main data storage machine and its associated backup machine.

SUMMARY OF THE INVENTION

An object of the invention is to solve the above mentioned technical problem.

The object of the present invention is a method for sending a plurality of data from a server to a fleet of devices. The method comprises the following steps:
  splitting said plurality of data in a set of disjoint batches,
  uniquely allocating to each of said disjoint batches a time slot,
  identifying a selected data belonging to the disjoint batch which is allocated to the current time slot and sending the selected data from the server to one device of said fleet,
  if an incident occurs at the server, discarding from the server the disjoint batch allocated to the time slot during which the incident occurred.

Advantageously, each of said data may be either a telecom subscription intended to be installed in one device of said fleet or intended to be sent once only by the server.

Advantageously, all time slots may have a same size which is set to be greater than the maximum synchronization latency of the plurality of data.

Advantageously, the server may include at least one machine adapted to identify the selected data belonging to the disjoint batch which is allocated to the current time slot and said incident may occur when said machine becomes unavailable.

Advantageously, the incident may occur when a preset security alert is triggered on the server.

Another object of the invention is a server storing a plurality of data intended to be sent to a fleet of devices. The server is configured to split said plurality of data in a set of disjoint batches. The server is configured to uniquely allocate to each of said disjoint batches a time slot. The server is configured to identify a selected data belonging to the disjoint batch allocated to the current time slot and to send the selected data to one device of said fleet. The server is configured to discard the disjoint batch allocated to the time slot during which an incident occurred at the server.

Advantageously, the server may include a main machine and a backup machine and the backup machine may be adapted to discard the disjoint batch allocated to the time slot during which the main machine becomes unavailable.

Advantageously, the server may include first and second machines wherein each of said machines stores a backup of the other machine. Said first and second machines may be adapted to discard the disjoint batch allocated to the time slot during which the other machine becomes unavailable.

Advantageously, the server may be configured to detect the incident when restarting.

Advantageously, the server may be configured to detect the incident as being a preset security alert triggered on the server.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of server intended to send data to a plurality of devices. It is well-suited for server managing remotely the download of data in a fleet of devices. Such devices may be a tamper-resistant device (like a smart card), a contactless token, a USB token, a smartphone, a tablet, a wearable device (like a smart watch or a ring), a secure element embedded in a hosting device (like a car) and any computer for example.

Figures 1, 2:
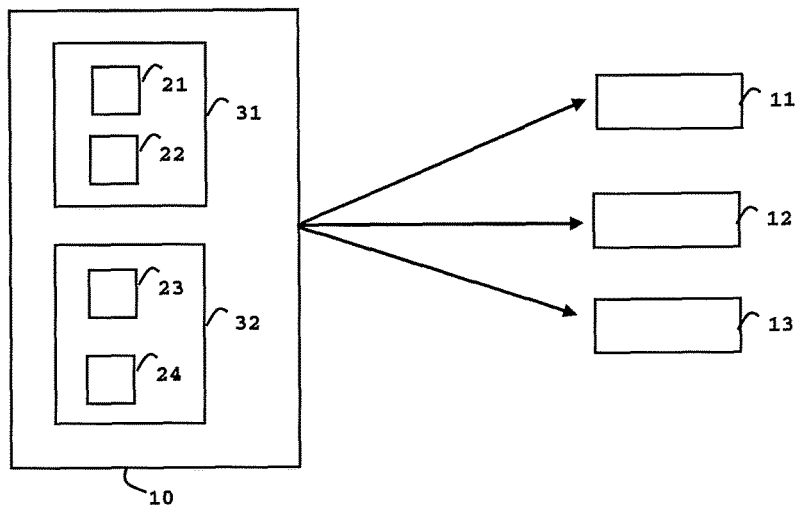
FIG. 1 shows a diagram of a system comprising a server and a fleet of devices according to an example of the invention.
FIG. 2 shows an example of table comprising batches and associated time slots according to the invention.

FIG. 1 shows an example of a system comprising a server and a fleet of devices according to an example of the invention.

In this example, the server 10 comprises two batches 31 and 32. The batch 31 comprises two data 21 and 22. The batch 32 comprises two data 23 and 24. The data 21-24 may be Telecom subscriptions intended to be installed on the devices 11-13. The devices 11-13 may be embedded Universal Integrated Circuit cards (eUICC) where a eUICC is the hardware token for supporting multiple subscriptions simultaneously. Each subscription is stored in a profile area. A profile area is a dedicated space on the eUICC to store a Telecom Subscription and only one subscription. Each profile area is independent and secured with dedicated keys to access its content.

The data 21-24 may be any application or service intended to be installed in the fleet of devices 11-13. For instance, data 21-24 may be a banking application, a PKI certificate or an application providing access to a transport network.

The server contains a description of the content of the batches. For example, the server can comprise a database, one or several files, one or several tables or any relevant container for storing content of the batches.

FIG. 2 shows an example of a table comprising several batches and their associated time slots according to the invention.

In this example, the server comprises three batches. The first batch (batch number 1 in column 1) includes three data (i.e. subscriptions in this example). The second batch (batch number 2) includes two data while the third batch (batch number 3) includes four data.

More precisely, the second batch comprises two subscriptions whose ICCID are xxxxxxxx4 and xxxxxxxx5 and which are intended to be downloaded from the server.

A first time slot has been allocated to the first batch. This first time slot is defined by a starting time T0 and a size equal to W. Thus the first batch will be available for download from the server during the time T defined as follow: $T0 \leq T < T0+W$.

For instance, the size W may be set to 1, 5, 10 or 60 minutes.

In this example, the time slot allocated to the second batch is defined by a starting time $T1=T0+W$ and a size equal to W and the time slot allocated to the third batch is defined by a starting time $T2=T0+2W$ and a size equal to W.

In this example, two consecutive time slots are contiguous. Alternatively a gap may be planned between some of the time slots.

It is to be noted that the time slots do not necessarily have the same size. In particular, the size may vary depending on the number of data belonging to the corresponding batch or the theoretical downloading time for the content of the batch.

Advantageously, the time slots may be defined in a cyclic way. For instance, the first time slot may be specified as time T defined by: $T0+3nW \leq T < T0+3nW+W$, the second time slot may be specified as time T defined by: $T0+W+3nW \leq T < T0+2W+3nW$ and the third time slot may be specified as time T defined by: $T0+2W+3nW \leq T < T0+3W+3nW$, where n is an integer$\geq 0$.

Preferably, all time slots have a size which is set to be greater than the maximum synchronization latency of the batch.

Figure 3:
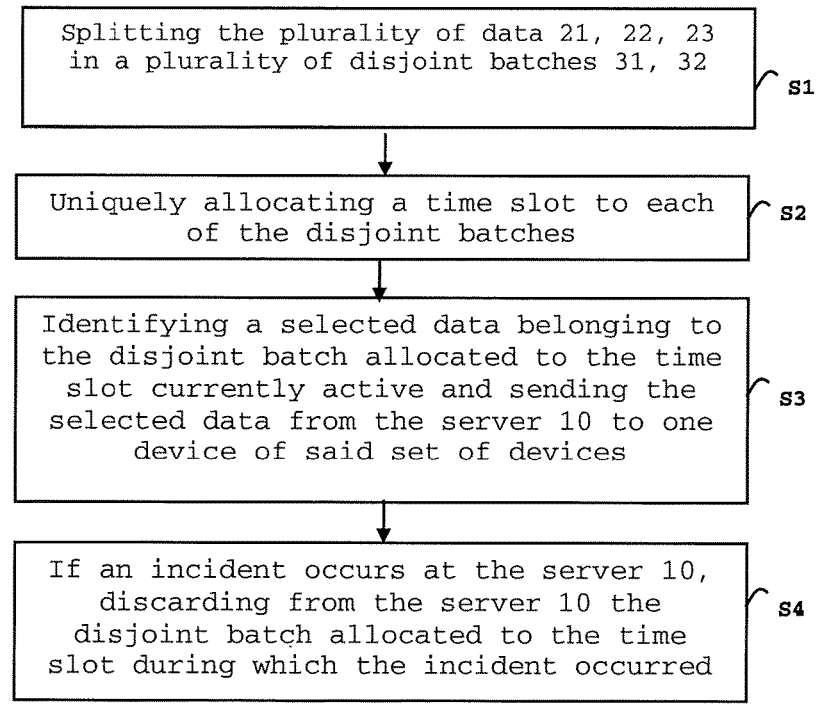
FIG. 3 shows an exemplary flow diagram for managing the data to be sent from the server according to the invention.

FIG. 3 shows an example of a flow diagram for managing the data to be sent from the server according to the invention.

At first step S1, a set of data intended to be sent by the server 10 is split in a plurality of disjoint batches. These batches are called disjoint because a data can belong to one batch only. The server 10 presented at FIG. 1 shows an example of batches at the end of step S1.

At step S2, a time slot is uniquely associated with each of the disjoint batches. In other words, each batch is associated with a specific time slot. Preferably, a time slot is not allocated to several batches of the plurality of data. It is to be noted that the server may manage the download of several sets of data; for instance, a set of Telecom subscriptions and a set of PKI certificates. In this case, a batch of Telecom subscriptions and a batch of PKI certificates can be allocated to the same time slot or to time slots that overlap partially.

At step S3, a request for downloading a data to a targeted device occurs. In response, a data is identified and selected in the batch allocated to the current time slot.

For instance, the identification may be done by selecting the first available data in a list of data belonging to the batch. Then the selected data is sent from the server 10 to the targeted device. The server keeps a track of this sending so as to avoid sending again the same data. For instance, the list of data belonging to the batch may be updated to mark the data has sent (or used).

At step S4, if an incident occurs at the server 10, the server 10 discards the batch allocated to the time slot during which the incident occurred. If an incident occurs at the server and if the backup machine has not been updated to reflect the list of already used (downloaded) data, the invention allows to avoid sending again the same data. The invention allows to avoid cloning of same data in several devices.

A data may have been successfully downloaded in a device and discarded from the server due to the invention. Advantageously, the server may be designed to, discover such a data in a further phase. For instance, before downloading a new data in the device, the server may check the content of data already downloaded/installed in this device from the server.

It is to be noted that each batch comprises a list of data available for download during the time window associated with the batch.

Figure 4:
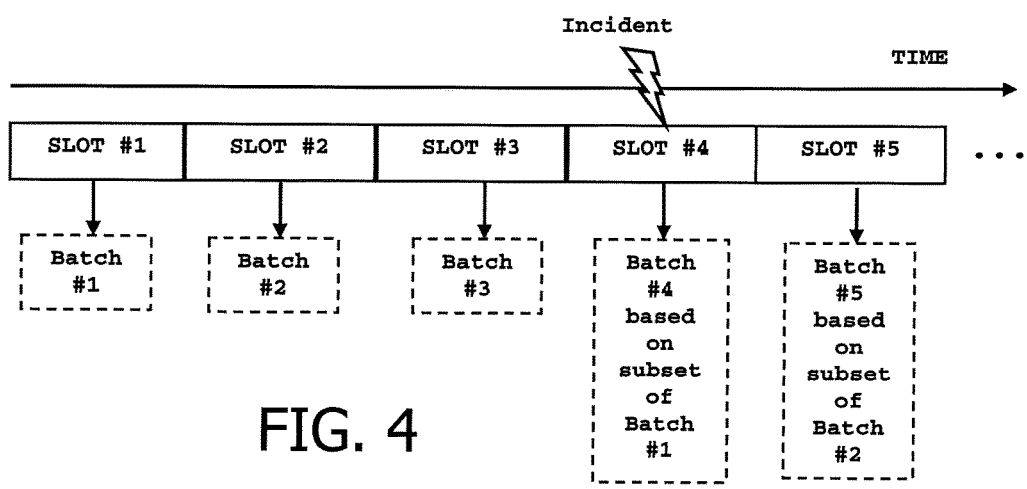
FIG. 4 shows an example of a series of time slots and their associated batches according to the invention.

FIG. 4 shows an example of a series of time slots and their associated batches according to the invention.

The example of FIG. 4 illustrates a way to manage allocation of time slots in a cyclic manner. The batches #1, #2 and #3 are respectively allocated to time slots #1, #2 and #3. The time slot #4 is associated with the batch #4 which is based on a subset of the batch #1. More precisely, the batch #4 may contain all the data of the batch #1 which have not been downloaded. Optionally, the batch #4 can also contain additional data so that the batch #4 has a size similar to that of batch #1.

In a similar manner, the slot #5 is associated with the batch #5 which is based on a subset of the batch #2, and so on.

If an incident occurs when the time slot #4 is active, only the content of the batch #4 is discarded from the server.

Figure 5:
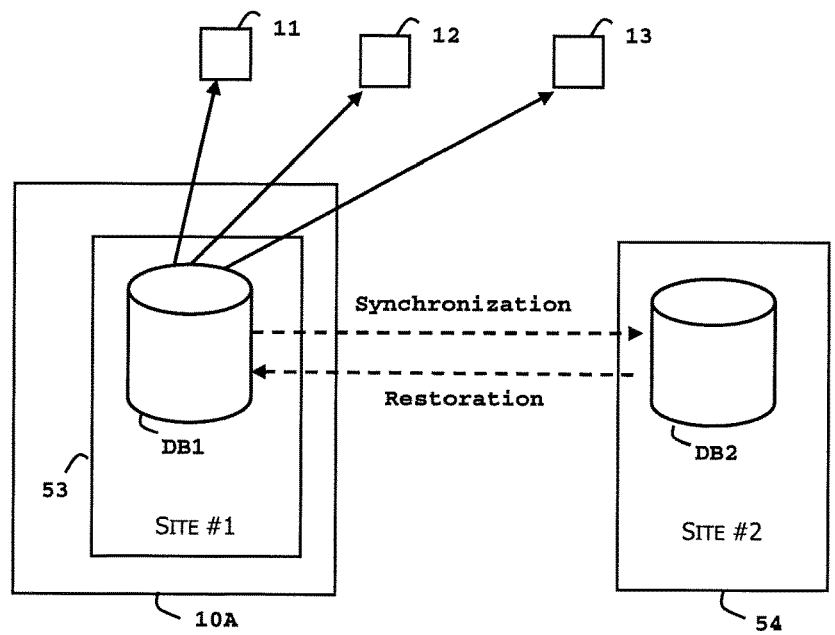
FIG. 5 shows a first example of a system comprising a main data storage machine and a backup machine according to the invention.

FIG. 5 depicts a first example of a system comprising a main data storage machine and a backup machine according to the invention.

In this example, the server 10A comprises a main data storage machine 53 located in a first site. The main data storage machine 53 comprises a database DB1 which stores all data to be downloaded in the fleet of devices 11, 12, 13.

The content of the database DB1 is regularly saved in the backup machine 54 located in a second site distinct from the first site. Although, the invention is well-suited form geo-redundant system, it may also apply to systems where the main data storage machine and the backup machine are located at the same site.

The backup machine 54 comprises a database DB2 which stores an image (or several images) of the database DB1. The regular saving of the database DB1 in the database DB2 is also named synchronization.

In case of serious incident at the server 10A, the content of the data base DB1 is restored (i.e. populated) thanks to the content of the database DB2. This operation is named restoration.

According to the invention, the content of the batch associated with the time slot during which the incident occurred is discarded from the server 10A. In other words, the content of this batch is not restored in the server 10A from the backup machine 54. All data of this batch are definitively canceled and will not be used for further downloading. Optionally, all data of this batch are kept and marked as being in an unknown state (which may be switched to an "already downloaded" state after a successful discovery operation as mentioned at FIG. 3). It is to be noted that the word "discard" means the data are no more available for a further download from the server.

An incident may occur when the server becomes inaccessible (or unavailable) or is no longer operational. For instance an incident occurs in case of crash of the main data storage machine 53. The server 10A may be designed to detect the incident when (re)starting.

An incident may also occur when a security rule is violated. For instance, the incident may occur when a predefined security alert is triggered on the server.

Preferably, the restoration process is carried out by a software engine (not shown at FIG. 5) dedicated to the restoration of the data in the server after an incident. This software engine may be located in the server 10A or in the backup machine 54. This software engine is designed to restore the content of the server 10A except the content of the batch associated with the time slot during which the incident occurred.

Figure 6:
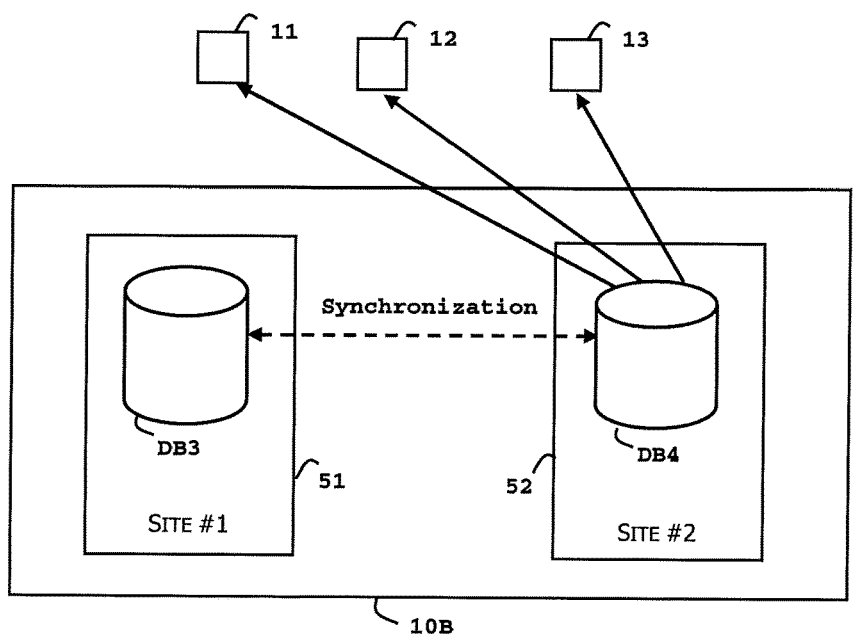
FIG. 6 shows a second example of a system comprising a main data storage machine and a backup machine according to the invention.

FIG. 6 depicts a second example of a system comprising a main data storage machine and a backup machine according to the invention.

In this example, the server 10B comprises both a main data storage machine 51 located in a first site and a backup machine 52 located in a second site preferably distinct from the first site. The main data storage machine 51 comprises a database DB3 which stores all data to be downloaded in the fleet of devices 11, 12, 13.

The content of the database DB3 is regularly saved in the database DB4 of the backup machine 52.

In the example of FIG. 6, the main data storage machine 51 can act as a backup entity for the backup machine 52. In case of serious incident at main data storage machine 51, the backup machine 52 takes the control of the downloading operation so that data are now sent by the backup machine 52 when a data must be downloaded in one device belonging to the fleet of devices. It is to be noted that the database DB4 discards the content of the batch associated with the time slot during which the incident occurred at the main data storage machine 51. In this case, the main data storage machine 51 acts as a backup entity for the backup machine 52 while the data download remains managed by the backup machine 52.

In another example (not drawn), the system may comprise several main data storage machines and at least one backup machine which run in parallel.

In a further example, several batches may be allocated to a single time slot. For instance, a first batch related to a fleet of smartphones and a second batch related to a fleet of tablets may be allocated to the same time slot. In case of serious incident at the server, content of both first and second batches will be discarded from the server.

The invention is well-suited for managing data which are intended to be sent once only by the server. (except for data that are recycled after an uninstall process in the device in which they were loaded correctly.)

The invention is not limited to the described embodiments or examples. In particular the features described in the above-presented examples and embodiments may be combined.

The invention is not limited to subscription management and may apply to download of any type of data.

The invention claimed is:

1. A method for sending a plurality of data from a server to a fleet of devices,
wherein the method comprises the following steps:
splitting said plurality of data in a set of disjoint batches,
uniquely allocating to each of said disjoint batches a time slot,
identifying a selected data belonging to a disjoint batch which is allocated to a current time slot and sending the selected data from the server to one device of said fleet,
if an incident occurs at the server, discarding from the server a disjoint batch allocated to a time slot during which the incident occurred.

2. A method according to claim 1, wherein each of said data is either a telecom subscription intended to be installed in one device of said fleet or intended to be sent once only by the server.

3. A method according to claim 1, wherein all time slots have a same size which is set to be greater than a maximum synchronization latency of the plurality of data.

4. A method according to claim 1, wherein said server includes at least one machine adapted to identify the selected data belonging to the disjoint batch which is allocated to the current time slot and wherein said incident occurs when said at least one machine becomes unavailable.

5. A method according to claim 1, wherein said incident occurs when a preset security alert is triggered on the server.

6. A server storing a plurality of data intended to be sent to a fleet of devices,
wherein said server is configured to split said plurality of data in a set of disjoint batches, the server is configured to uniquely allocate to each of said disjoint batches a time slot, the server is configured to identify a selected data belonging to a disjoint batch allocated to a current time slot and to send the selected data to one device of said fleet of devices, and the server is configured to discard a disjoint batch allocated to a time slot during which an incident occurred at the server.

7. A server according to claim 6, wherein the server includes a main machine and a backup machine and wherein the backup machine is adapted to discard a disjoint batch allocated to a time slot during which the main machine becomes unavailable.

8. A server according to claim 6, wherein the server includes first and second machines, wherein each of said machines stores a backup of the other machine, wherein said first and second machines are adapted to discard a disjoint batch allocated to a time slot during which the other machine becomes unavailable.

9. A server according to claim 6, wherein said server is configured to detect the incident when restarting.

10. A server according to claim 6, wherein said server is configured to detect the incident as being a preset security alert triggered on the server.

* * * * *